[20.]

S. Rousculp & I. B. Shambaugh.
Dumping Car.

No. 118,557.

Patented Aug. 29, 1871.

Witnesses:
J. H. Almqvist
Gustave Dieterich

Inventors:
S. Rousculp
I. B. Shambaugh
Per
Munn & Co
Attorneys.

UNITED STATES PATENT OFFICE.

SOLOMON ROUSCULP, OF THORNVILLE, AND ISAAC B. SHAMBAUGH, OF SCIO, OHIO.

IMPROVEMENT IN DUMPING-CARS.

Specification forming part of Letters Patent No. 118,557, dated August 29, 1871.

*To all whom it may concern:*

Be it known that we, SOLOMON ROUSCULP, of Thornville, in the county of Perry, and ISAAC B. SHAMBAUGH, of Scio, in the county of Harrison and State of Ohio, have invented a new and Improved Dumping-Car; and we do hereby declare that the following is a full, clear, and exact description thereof, which will enable others skilled in the art to make and use the same, reference being had to the accompanying drawing forming part of this specification.

Our invention has for its object to provide an improved dumping-car for use in ballasting railways, from which, by simply turning a shaft, and thereby opening hinged doors in the bottom, the load of gravel or other material may be discharged, the same shaft and connected mechanism being used for closing the bottom, and thus putting the car in condition to receive another load. The invention consists in the arrangement of parts for performing this function.

Figure 1:
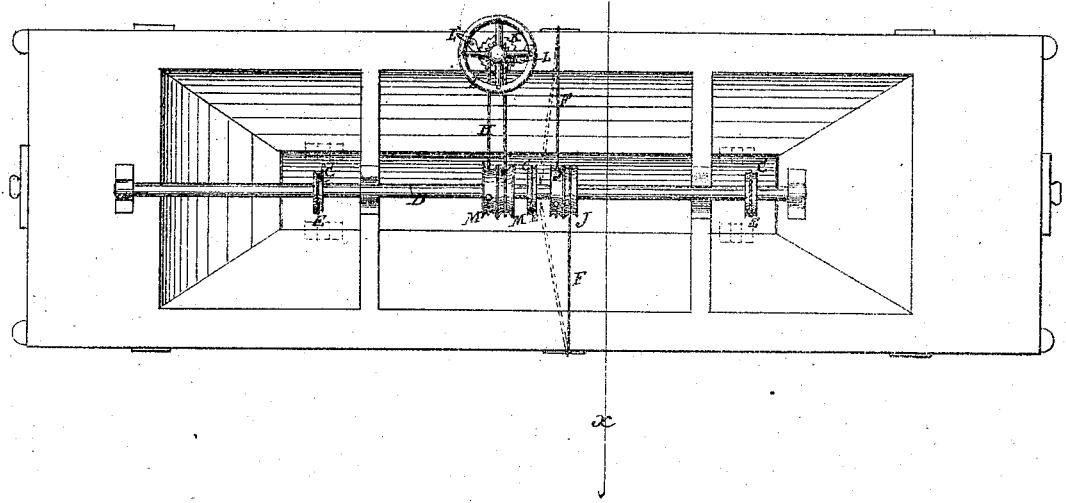
Figure 2:
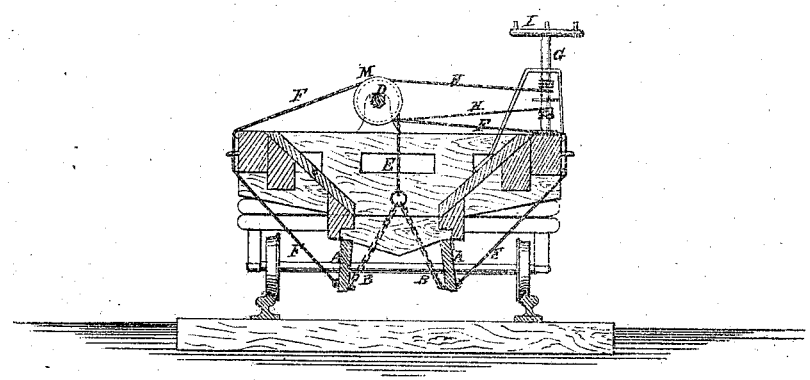

Figure 1 is a top or plan view of our improved dumping-car, and Fig. 2 is a transverse section.

Similar letters of reference indicate corresponding parts.

The bottom is preferably partly hopper-shaped or descending toward the center for facilitating the delivery of the load as near the center of the road as possible; but it has a level portion at the center, consisting of the two boards A hinged to the bottom of the descending part so as to open downward and close upward, the said boards meeting together at the center of the car when closed. These boards are connected at the upper sides at each end or thereabout by chains B to a chain or cord, E, attached to a pulley, C, on a shaft, D, extending along the center of the car from end to end, and supported in suitable bearings above it so as to close the boards when turned in one direction, and the said boards have a cord, F, attached to the lower side and extending around the outer edge of the car up to the said shaft, and attached to pulleys J thereon so as to wind up and draw the boards down when cords or chains E are unwound, and to unwind and allow the boards A to be closed when the shaft D is turned in the direction to wind up the chains E. And for turning said shaft D forward and backward for thus opening and closing bottom boards A, the pulleys M on shaft D are connected, by a cord or belt, H, to a vertical shaft, G, similar to a brake-shaft with a hand-wheel, I, at one side of the car, which being turned one way will open the bottom A, and the other way will close it. The said shaft is provided with ratchets K and pawls L arranged to hold it from turning either way, by which the opening may be kept entirely closed or partially so, as may be preferred, for dumping the whole load at once, or allowing it to discharge gradually while the car is moving along. The shaft D may be turned by hand-crank applied to the ends, or by any other competent means.

Having thus described our invention, we claim as new and desire to secure by Letters Patent—

The improved dumping-car formed of the hinged bottom boards A A, cords or chains E B F, and belts H H, shaft D and its pulleys, shaft G provided with hand-wheel I, and the ratchets and pawls K L, all arranged as shown and described, whereby the bottom boards may be opened and closed by operation of the shaft G, as specified.

SOLOMON ROUSCULP.
ISAAC B. SHAMBAUGH.

Witnesses:
SIMON P. ROUSCULP,
MILFORD TROVINGER.